United States Patent [19]

Armbruster et al.

[11] Patent Number: 5,021,539

[45] Date of Patent: Jun. 4, 1991

[54] ALKALINE BENZYLIC ETHER PHENOLIC RESIN BINDERS

[75] Inventors: David R. Armbruster, Forest Park; Merlyn C. Pasion, Chicago, both of Ill.

[73] Assignee: Acme Resin Corporation, Westchester, Ill.

[21] Appl. No.: 328,438

[22] Filed: Mar. 24, 1989

[51] Int. Cl.$^5$ .................. C08G 8/04; C08L 61/00; B22C 1/22; B22C 9/00

[52] U.S. Cl. .................. 528/129; 528/139; 528/140; 524/594; 524/595; 524/596; 524/611; 523/143; 523/145; 523/146; 523/147; 264/82; 164/12; 164/16

[58] Field of Search .................. 528/129, 139, 140; 523/145, 146, 147, 143; 524/594–596, 611; 264/82; 164/12, 16

[56] References Cited

U.S. PATENT DOCUMENTS

| | | | |
|---|---|---|---|
| Re. 32,720 | 7/1988 | Lemon et al. | 264/82 |
| 3,485,797 | 12/1969 | Robins | 526/71 |
| 4,140,845 | 2/1979 | Vasishth | 528/140 |
| 4,268,425 | 5/1981 | Gardikes | 523/143 |
| 4,549,187 | 10/1985 | Levy | 428/388 |
| 4,668,359 | 8/1984 | Lemon et al. | 204/182.7 |
| 4,668,759 | 5/1987 | Iyer et al. | 528/139 |
| 4,780,489 | 10/1988 | Dunnavant et al. | 523/145 |

FOREIGN PATENT DOCUMENTS 0211316 2/1987 European Pat. Off. .

*Primary Examiner*—John Kight, III
*Assistant Examiner*—P. Hampton-Hightower
*Attorney, Agent, or Firm*—Rockey and Rifkin

[57] ABSTRACT

Modified benzylic ether resole resins and process for their preparation. The resins are prepared by treating a phenol with a molar excess of aldehyde in the presence of a divalent metal ion catalyst at a pH below 7 followed by further reaction at a pH above 8 in the presence of an alkaline catalyst. Alkaline solutions of the resins are used as foundry binders in an ester cure process.

40 Claims, No Drawings

ALKALINE BENZYLIC ETHER PHENOLIC RESIN BINDERS

FIELD OF THE INVENTION

This invention relates to modified benzylic ether resole resins useful in binder compositions, moldable compositions which include the binders and aggregate material, and a process for making moldable compositions from them. More particularly, the invention relates to foundry binder compositions, moldable compositions including the same and aggregate material, and foundry cores for molds made therefore, including a process or their manufacture.

BACKGROUND OF THE INVENTION

Binders or binder systems for foundry cores and molds are well known. In the foundry art, cores or molds for making metal castings are normally prepared from a mixture of an aggregate material, such as sand, and a binding amount of a binder or binder system. Typically, after the aggregate material and binder have been mixed, the resulting mixture is rammed, blown or otherwise formed to the desired shape or pattern, and then cured with the use of catalysts and/or heat to a solid, cured state.

Resin binders used in the production of foundry molds and cores ar often cured at high temperatures to achieve the fast-curing cycles required in foundries. However, in recent years, resin binders have been developed which cure at low temperatures, to avoid the need for high-temperature curing operations which have higher energy requirements and which often result in the production of undesirable fumes.

One group of processes which do not require heating in order to achieve curing of the resin binder are referred to as "cold-box" processes. In such processes, the binder components are coated on the aggregate material, such as sand, and the material is blown into a box of the desired shape. Curing of the binder is carried out by passing a gaseous catalyst or hardener at ambient temperatures through the molded resin-coated material.

One such "cold-box" process employs an aqueous alkaline solution of a phenolic resole resin as the binder. This binder is cured by passing the volatile ester through the molded resin-coated material. The process is described in detail in U.S. Pat. No. 4,468,359 (Re. 32,720) which is incorporated herein by reference in its entirety.

The ester cured process is superior to some of the earlier processes from an environmental standpoint. However, the tensile strengths of the cores made by this process tend to be somewhat lower than those prepared by other "cold-box" processes.

We have now discovered that certain modified benzylic ether resole resins, not hitherto used with ester-cured phenolic binder systems, speed the rate of cure of such systems, giving molds and cores with higher initial tensile strength. This reduces breakage of the cores when they are first removed from the core boxes. We have also discovered that if certain additives are used with these resins they give cores and molds of even greater tensile strength.

It is known that benzylic ether resins can be prepared by the reaction of an aldehyde with phenol in the presence of a divalent metal ion catalyst, U.S. Pat. No. 3,485,797. Their use in making polyurethane binders for foundry cores and molds is well known. More recently, in U.S. Pat. No. 4,668,759, a modified phenolic resole resin was prepared by partial reaction of an aldehyde with phenol under strongly basic conditions followed by further reaction at a pH below 7 in the presence of a catalyst which promotes formation of benzylic ether bridges. The presently-disclosed resins differ from both of the foregoing products. The new resins are prepared by partial reaction of the aldehyde and phenol in the presence of a benzylic ether promoting catalyst and then completion of the reaction under alkaline conditions.

SUMMARY OF THE INVENTION

In accordance with this invention, there is provided a process for preparing a modified benzylic ether resole resin comprising the steps:
  (a) reacting a phenol with a molar excess of an aldehyde in the presence of a divalent metal ion catalyst at a pH below 7 until from about 20% to about 90% by weight of the aldehyde has combined with the phenol;
  (b) adding sufficient basic catalyst to the mixture of step (a) to raise the pH to at least about 8; and
  (c) heating the mixture obtained in step (b) until the free aldehyde in the mixture is less than about 5% by weight of the mixture.

Further, in accordance with this invention, there is provided a modified benzylic ether resole resin obtained by the above process, a foundry molding composition which comprises a mixture of the modified benzylic ether resole resin of this invention with granular refractory material, and a process for the production of foundry cores and molds using this foundry molding composition.

DETAILED DESCRIPTION OF THE INVENTION

In the practice of this invention, the modified phenolic resole resins are produced by a multistep process. In the first step of the process, a phenol reacts with a molar excess of an aldehyde in the presence of a divalent metal ion catalyst. The phenols employed in the formation of the phenolic resin are generally any of the monohydric phenols which may be utilized to prepare phenolic resins. Exemplary phenols include phenol itself and the cresols.

The aldehyde employed in the formation of the phenolic resin may also vary widely. Suitable aldehydes include any of the aldehydes heretofore employed in formation of phenolic resins, such as formaldehyde, acetaldehyde, propionaldehyde, furfuraldehyde, and benzaldehyde. In general, the aldehydes employed have the formula RCHO, where R is a hydrogen or a hydrocarbon radical of 1 to 8 carbon atoms. The most preferred aldehyde is formaldehyde.

The divalent metal ion catalyst is one which causes formation of ortho-ortho benzylic ether bridges between the phenolic nuclei in the resin. Catalysts useful for this purpose include salts of the divalent ions of Mn, Zn, Cd, Mg, Co, Ni, Fe, Pb, Ca, and Ba. A preferred catalyst is zinc acetate. These catalysts give phenolic resins wherein the bridges joining the phenolic nuclei in the resin are predominantly ortho-ortho benzylic ether bridges of the general formula $-CH_2(OCH_2)_n-$ where n is a small positive integer.

The preferred phenolic resins employed in the practice of this invention are made from phenol and formaldehyde at a mole ratio of formaldehyde to phenol in the range of from about 1.2:1 to about 2.6:1. The most preferred mole ratio of formaldehyde to phenol is a mole ratio in the range of from about 1.5:1 to about 2.2:1.

The first step of the process is carried out by treating the mixture of phenol and aldehyde in an aqueous solution with the divalent metal ion catalyst at a temperature sufficient to cause reaction, preferably at about 70° C. or above until the free aldehyde in the mixture is in the desired range. Suitable resins are obtained when the first step of the process is carried out until from about 20% to about 90% of the aldehyde has reacted with the phenol. Reaction temperatures are controlled by conventional means, such as heating, cooling, or portionwise addition of catalyst.

When the reaction has proceeded to the desired stage, as indicated by the amount of free aldehyde remaining in the reaction mixture, a basic catalyst is added to the reaction mixture to raise the pH to at least about 8. Preferably, the pH of the mixture is at least about 9.

In the next step of the process, the reaction mixture containing the basic catalyst is heated again at a temperature sufficient to cause reaction, preferably at about 55° C. or above. Heating is continued until the free aldehyde in the solution is less than about 5%, preferably less than about 2% by weight.

Any of the commonly used basic catalysts may be used to prepare the phenolic resole resin. However, the preferred alkali in the product is KOH when the resin is used in the ester cured process. For this reason, this alkali may be used in the manufacture of this resin or may be added to the resin subsequent to its preparation. The alkalinity of the resin is expressed in terms of the molar ratio of KOH to the phenol in the resin. However, other alkalis are not excluded and may be used alone or in combination with KOH.

The molar ratio of KOH:phenol in the final resin solution used in the ester cured process is in the range of from about 0.2:1 to about 1.2:1, preferably from about 0.4:1 to about 0.9:1.

When the reaction reaches the desired degree of completion, the water content of the resin may be adjusted to the desired value. Water content of the resin may be adjusted by evaporation under reduced pressure or by the addition of water.

The resins of this invention are useful as binders for preparing foundry molding compositions. As noted above, they are particularly useful binders in the ester cured process. When the resins are used in this process, the solids content of the aqueous alkaline solution is preferably in the range of from about 40% to about 75% by weight.

Foundry molding compositions used in the ester cured process comprise a granular refractory material and from about 0.5% to about 8% by weight of the refractory material of the aqueous alkaline binder solution. The granular refractory materials used in the molding composition may be any of the refractory materials employed in the foundry industry for the production of molds and cores, such as silica sand, chromite sand, zircon sand or olivine sand and mixtures thereof. When such sands are used, it is preferred that the binder solution be present in an amount of from about 1% to about 3% by weight of the sand.

Other commonly employed additives such as urea and organosilanes can be optionally used in the binder compositions of this invention. The organosilanes, which are known coupling agents, enhance the adhesion of the binder to the sand. Examples of useful coupling agents of this type include aminosilanes, epoxysilanes, mercaptosilanes, hydroxysilanes and ureidosilanes.

Other additives which are particularly useful in the practice of this invention are phenoxyethanols having the general formula:

$$Ar-O-CHR^1-CHR^2-OH$$

In this formula, the Ar is the phenyl group or the phenyl group substituted with one or more halogens, hydroxy, alkoxy or alkyl groups. $R^1$ and $R^2$ in the formula may be the same or different and represent hydrogen, alkyl or alkoxy.

Exemplary additives include phenoxyethanol, 1-phenoxy-2propanol, 2-(4-bromophenoxy)ethanol and 2-(4-chlorophenoxy)ethanol. Phenoxyethanol is particularly useful additive in the practice of this invention.

The phenoxyethanol additive is used in an amount of at least about 1% by weight of the phenolic resole resin. A preferred concentration is from about 2% to about 6% by weight of the phenolic resole resin but greater concentrations may be beneficial in some circumstances. The additive should be one that in the amount used is soluble in the aqueous alkaline solution of the phenolic resole resin. These additives have the ability to increase the tensile strength of cores and molds made with the binders of this invention as well as those made with conventional resole resin binders.

When the binders of this invention are used for the production of foundry cores and molds, the refractory material such as foundry sand is mixed thoroughly with the aqueous alkaline binder solution. Mixing is carried out until substantially all of the sand particles are coated completely and uniformly with the binder solution. The refractory material coated with the binder is then placed in a vented core or mold box, such as is used in conventional "cold-box" processes.

The mixture of sand and resin is hardened by passing a volatile ester through the material in the vented box. The preferred esters used for gassing the mixture are the lower alkyl formates. The most preferred ester is methyl formate. As is known in the art, such esters are not usually used as a pure gas, but as a vapor or aerosol in an inert carrier gas. Such inert carrier gases are those which do not react with the ester or have an adverse affect on the curing reaction of the properties of the product. Suitable gases include air, nitrogen or argon.

The following specific examples illustrate the present invention. They are not intended to limit the invention in any way. As otherwise indicated, all parts and percentages are by weight.

EXAMPLE 1

A mixture of 1,000 parts of phenol, 1,276 parts of 50% aqueous formaldehyde solution and 42 parts of a 25% aqueous zinc acetate solution was heated at 90° C for 14 hours and then cooled. The free formaldehyde of the reaction mixture was 8.9%, indicating that about 68% of the formaldehyde had combined with the phenol. Then 850 parts of 45% of potassium hydroxide and 100 parts of water were added. Reaction was continued at 80° C. for 100 minutes before the reaction mixture was cooled and 16 grams of gamma-aminopropyltriethoxysilane was added. The viscosity of the resin was 164 cps at 25° C.

Comparative Test Resin

A comparative test resin was prepared by mixing 1,000 parts of phenol, 800 parts of 45% aqueous KOH and 135 parts of water. To this mixture was added 1,276 parts of 50% aqueous formaldehyde over a period of 30 minutes, while holding the temperature at 80° C. The reaction was continued at 80° C. for four hours and then cooled. To this mixture was added 16 grams of gamma-aminopropyltriethoxysilane to give a final product which had a viscosity of 154 cps at 25° C.

Tests On Resin Coated Sands

The following tests were performed using the resin of Example 1 and the comparative test resin. Each resin sample was coated on Wedron 530 sand in a Hobart mixer. The amount of resin used was 1.75% of the weight of the sand. The coated sands were then tested making standard AFS (dog bone) tensile cores. Test cores were prepared by blowing the mixture at 80 lbs. per square inch (psi) air pressure into a Redford laboratory three cavity cold box machine. The cores were cured by gassing with a 70:30 mixture of methyl formate and air for seven seconds. Tensile strengths were measured at one minute, 30 minutes, one hour and 24 hours after gassing, using a Detroit Testing Machine Company Model CST Tensile Tester. Results of the tests given in Table I show that cores made using the resin of this invention have superior strength to those prepared using the resins of the prior art:

TABLE I

| Tensile Strength of Cores Prepared Using Resole Binders | | | | |
|---|---|---|---|---|
| | Tensile Strength (psi) | | | |
| Resin | 1 min. | 30 min. | 1 hour | 24 hours |
| Modified Benzylic Ether Resole | 126 | 110 | 154 | 162 |
| Conventional Resole (Comparative Test) | 103 | 94 | 116 | 132 |

EXAMPLE 2

A second series of tests were performed using the resin of Example 1 to which 4% phenoxyethanol had been added, and the comparative test resin to which 4% phenoxyethanol had been added. The resins were coated on the sand, and the coated sands were tested as described above. The test results given in Table II show that cores made using the resins of this invention have even greater strength when the resins contain the additive phenoxyethanol. The tests further show that cores made using the resins of this invention containing phenoxy ethanol have superior strength to those prepared from conventional resole resin containing phenoxyethanol.

TABLE II

| Tensile Strengths of Cores Prepared Using Resole Binders containing 4% Phenoxyethanol | | | | |
|---|---|---|---|---|
| | Tensile Strength (psi) | | | |
| Resin | 1 min. | 30 min. | 1 hour | 24 hours |
| Modified Benzylic Ether Resole | 130 | 169 | 172 | 157 |
| Conventional Resole (Comparative Test) | 116 | 147 | 167 | 138 |

Thus, it is apparent that there has been provided, in accordance with this invention, a modified benzylic ether resole resin and foundry binder composition containing this resin that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to include all such alternatives, modifications and variations as set forth within the spirit and broad scope of the appended claims:

What is claimed is:

1. A process for preparing a modified benzylic ether resole resin comprising the steps:
   (a) first reacting a phenol with a molar excess of an aldehyde in the presence of a divalent metal ion catalyst at a pH below 7 until from about 20% to about 90% by weight of the aldehyde has combined with the phenol;
   (b) then adding sufficient basic catalyst to the mixture of step (a) to raise the pH to at least about 8; and
   (c) heating the mixture obtained in step (b) until the free aldehyde in the mixture is less than about 2% by weight of the mixture.

2. The process of claim 1 wherein the phenol is unsubstituted phenol and the aldehyde is an aqueous solution of formaldehyde.

3. The process of claim 2 wherein step (a) is carried out at a temperature of from about 70° C. or higher.

4. The process of claim 2 wherein step (c) is carried out at a temperature of about 55° C. or higher.

5. The process of claim 2 wherein step (c) is carried out until the amount of free aldehyde in the mixture is less than about 2% by weight of the mixture.

6. The process of claim 2 wherein the catalyst used in step (a) is zinc acetate.

7. The process of claim 2 wherein the basic catalyst added in step (b) is selected from the group consisting of potassium hydroxide, sodium hydroxide and mixtures thereof.

8. A modified benzylic ether resole resin obtained by a process comprising the steps of:
   (a) first reacting a phenol with a molar excess of an aldehyde in the presence of a divalent metal ion catalyst at a pH below 7 until from about 20% to about 90% by weight of the aldehyde has combined with the phenol;
   (b) then adding sufficient basic catalyst to the mixture of step (a) to raise the pH to at least about 8; and
   (c) heating the mixture obtained in step (b) until the free aldehyde in the mixture is less than about 5% by weight of the mixture.

9. The resin of claim 8 wherein the phenol is unsubstituted phenol, and the aldehyde is an aqueous solution of formaldehyde.

10. The resin of claim 9 wherein step (a) is carried out at a temperature of about 70° C. or higher.

11. The resin of claim 9 wherein step (c) is carried out at a temperature of about 55° C. or higher.

12. The resin of claim 9 wherein step (c) is carried out until the amount of free aldehyde in the mixture is less than about 2% by weight of the mixture.

13. The resin of claim 9 wherein the catalyst used in step (a) is zinc acetate.

14. The resin of claim 9 wherein the basic catalyst added in step (b) is selected from the group consisting of potassium hydroxide, sodium hydroxide and mixtures thereof.

15. A binder composition which comprises an aqueous alkaline solution of a phenolic resole resin, said aqueous solution having a solids content of from about 40% to about 75% by weight, said phenolic resole having an aldehyde:phenol molar ratio of from about 1.2:1 to about 2.6:1 and an alkali:phenol molar ratio of from about 0.2:1 to about 1.2:1, wherein the phenolic resole resin is the modified benzylic ether resole resin of claim 8.

16. The binder composition of claim 15 wherein the aldehyde:phenol molar ratio is from about 1.5:1 to about 2.2:1.

17. The binder composition of claim 15 wherein the alkali used to prepare the aqueous alkaline solution is selected from the group consisting of potassium hydroxide, sodium hydroxide and mixtures thereof.

18. The binder composition of claim 17 wherein the molar ratio of alkali to phenol is from about 0.4:1 to about 0.9:1.

19. The binder composition of claim 15 which further comprises an additive in an amount of at least about 1% by weight of the phenolic resole resin, said additive being soluble in the aqueous alkaline solution and having the general formula:

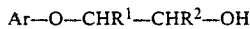

where Ar=phenyl or phenyl substituted with one or more halogen, hydroxy, alkoxy or alkyl groups and where $R^1$ and $R^2$ may be the same or different and=hydrogen, alkyl or alkoxy.

20. The binder composition of claim 19 wherein the additive is present in an amount of from about 2% to about 6% by weight of the phenolic resole resin.

21. The binder composition of claim 19 wherein the additive is phenoxyethanol.

22. A foundry molding composition which comprises a granular refractory material, and from about 0.5 to about 8% by weight of the refractory material of the binder composition of claim 15.

23. The foundry molding composition of claim 22 wherein the granular refractory material is selected from the group consisting of silica sand, chromite sand, zircon sand, olivine sand and mixtures thereof.

24. The foundry molding composition of claim 22 wherein the aqueous alkaline solution of a phenolic resole resin is present in an amount of about 1% to about 3% by weight of the sand.

25. The foundry molding composition of claim 22 wherein the alkali used to prepare the aqueous alkaline solution is selected from the group consisting of potassium hydroxide, sodium hydroxide and mixtures thereof.

26. The foundry molding composition of claim 25 wherein the molar ratio of alkali to phenol is from about 0.4: to about 0.9:1.

27. The foundry molding composition of claim 22 which further comprises a silane.

28. A foundry molding composition which comprises a granular refractory material, and from about 0.5 to about 8% by weight of the refractory material of the binder composition of claim 19.

29. The foundry molding composition of claim 28 wherein the additive is present in an amount of from about 2% to about 6% by weight of the phenolic resole resin.

30. The foundry molding composition of claim 28 wherein the additive is phenoxyethanol.

31. A process for the production of foundry cores and molds which comprises:
(a) mixing a granular refractory material with from about 0.5% to about 8% by weight of the refractory material of the binder of claim 15;
(b) placing the mixture of refractory material and binder in a vented core or mold box; and
(c) gassing the mixture in the core or mold box with a volatile ester.

32. The process of claim 31 wherein the granular refractory material is selected from the group consisting of silica sand, chromite sand, zircon sand, olivine sand and mixtures thereof.

33. The process of claim 31 wherein the binder is present in an amount of about 1% to about 3% by weight of the sand.

34. The process of claim 31 wherein the alkali used to prepare the aqueous alkaline solution of binder is selected from the group consisting of potassium hydroxide, sodium hydroxide and mixtures thereof.

35. The process of claim 34 wherein the ratio of alkali to phenol is from about 0.4:1 to about 0.9:1.

36. The process of claim 31 wherein the mixture of refractory material and binder further comprises a silane.

37. The process of claim 31 wherein the volatile ester is methyl formate.

38. A process for the production of foundry cores and molds which comprises:
(a) mixing a granular refractory material with from about 0.5% to about 8% by weight of the refractory material of the binder of claim 19;
(b) placing the mixture of refractory material and binder in a vented core or mold box; and
(c) gassing the mixture in the core or mold box with a volatile ester.

39. The process of claim 38 wherein the additive is present in an amount of from about 2% to about 6% by weight of the phenolic resole resin.

40. The process of claim 38 wherein the additive is phenoxyethanol.

* * * * *